United States Patent [19]
Bull

[11] 3,806,187
[45] Apr. 23, 1974

[54] ROLLAWAY TRUCK DOOR
[76] Inventor: Robert Bull, 2770 75th Ave., Oakland, Calif. 94605
[22] Filed: July 18, 1972
[21] Appl. No.: 272,791

[52] U.S. Cl. ............................................. 296/137 B
[51] Int. Cl. ............................................... B60j 7/10
[58] Field of Search .................. 296/137 B, 100, 26

[56] References Cited
UNITED STATES PATENTS
3,416,835   12/1968   Ohle .................................. 296/100
3,649,073   3/1972   Whittemore ........................ 296/100

*Primary Examiner*—Robert R. Song
*Attorney, Agent, or Firm*—Howard I. Podell

[57] ABSTRACT

A rollaway type truck door and mounting which may be fastened so as to serve as a removable cover to the top of an otherwise open pick-up truck body.

The cover consists of slats which are each hingeably fastened to the adjoining slats, with each slat mounted at its ends to wheels that fit in a U-shaped track mounted on each side of the truck body.

1 Claim, 2 Drawing Figures

PATENTED APR 23 1974 3,806,187
FIG. 1
FIG. 2
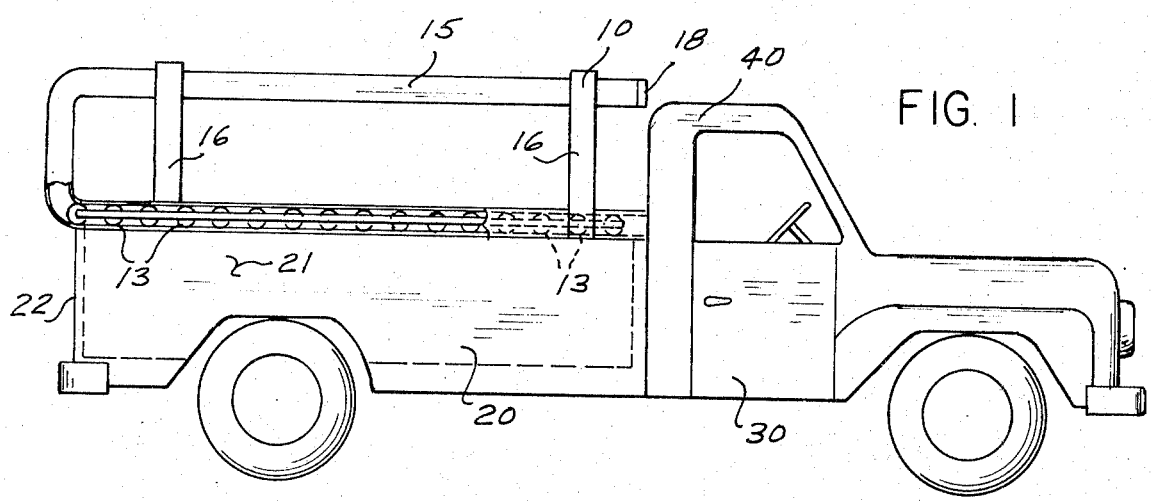
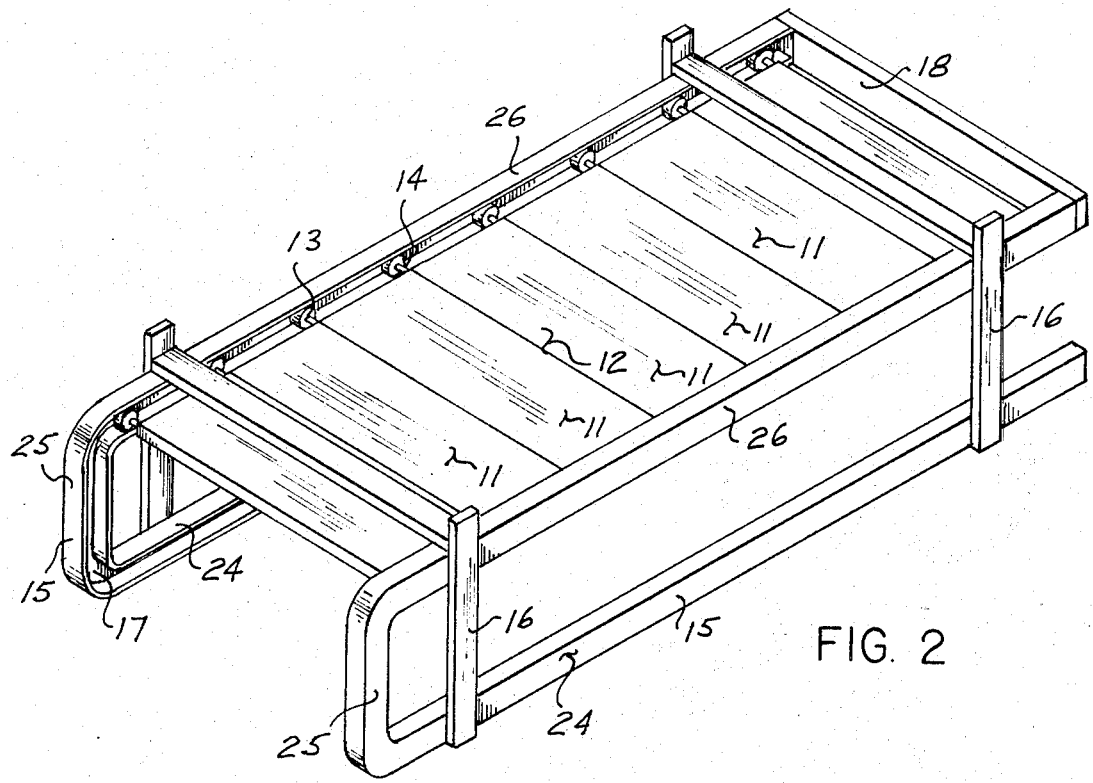

ROLLAWAY TRUCK DOOR

SUMMARY OF THE INVENTION

This invention relates to a rollaway door cover for trucks, and particularly to such a door cover which may be used to close off or open the top of an otherwise open pick-up truck body.

An advantage of this invention is that the unit may be mounted upon a conventional open pick-up truck body to afford theftproof security to the contents of the truck body as well as protection from the elements.

The rollaway door assembly is mounted in two frames, each frame being fastened to one side of the truck body above the truck side. Each frame runs along the upper truck side from the front to the back of the truck body, with the frame then turning at right angles to run vertically up a distance, and then turning vertically to run back to the front of the truck body over the truck body side. Each frame contains a track for the containment of the wheels which are fastened to each end of the hinged slats which make up the rollaway door assembly.

BRIEF DESCRIPTION OF THE DRAWING

The objects and features of the invention may be understood with reference to the following detailed description of an illustrative embodiment of the invention, taken together with the accompanying drawing in which:

FIG. 1 is a side view of the device mounted on a pick-up truck; and

FIG. 2 is a perspective view of the frame and rollaway door cover unit.

DESCRIPTION OF THE PREFERRED EMBODIMENT

Turning now descriptively to the drawing, in which similar reference characters denote similar elements throughout the several views, FIG. 1 illustrates the device 10 mounted on the open sides of the pick-up truck body 20 of truck 30. FIG. 2 illustrates the two frame sides 15 and the rollaway door cover assembly 12 which make up the device 10.

Each side frame 15 is formed of a shaped rail 17, the cross-section of which is U-shaped. A side frame 15 consists of a lower horizontal section 24 that runs the length of the truck body 20 on the top of a truck side 21, from the forward section of the body adjacent the truck cab 40 to slightly past the rear truck hinged door 22. This section of the frame then bends at right angles to form a vertical section 25 that rises above the rear of the truck body and joins an upper horizontal section 26 that runs above the lower horizontal section 24. Vertical members 16 join and support both upper and lower horizontal sections 26 and 24 of each frame 15. The two upper horizontal sections 26 are joined at the forward cab end of the truck body by transverse section 18.

The door cover assembly 12 is formed of slats 11 which are each hinged to the two adjoining slats 11. Wheels 13 are mounted to shafts 14 which protrude from the end of the slats 11, said wheels 13 riding inside the continuous U-shaped rail 17 forming the side frames 15. The slats 11 ride from the upper open position shown in FIG. 2, in which the slat wheels 13 ride in the upper horizontal frame sections 26, to the lower closed position shown in FIG. 1, in which the wheels 13 of the slats 11 rest in the lower horizontal frame sections 24. In the closed position, the slats 11 cover the truck body 20 from the back of the truck cab 40 to just past the rear door 22 of the truck body.

The door cover assembly 12 may be readily removed when it is desired to carry a load which protrudes above the horizontal frame section 26. Transverse member 18 is removed from the assembly, and the door assembly 12 may be slid off the frame rails over truck cab 40.

Since obvious changes may be made in the specific embodiment of the invention described, it is indicated that all matter contained herein is intended as illustrative and not as limiting in scope.

Having thus described my invention, what I claim as new and desire to secure by Letters Patent of the United States is:

1. A rollaway cover assembly for enclosing the top of a pickup truck bed which may be mounted to the sides of the body of a pickup truck bed comprising:

a cover door assembly which may be rolled to either a closed position directly over the sides of the attached truck body or rolled to an open position considerably above the top of the sides of the attached truck body, said cover door assembly consisting of several slats which are hinged along their sides to each other, with some of the slats mounted to wheels fixed to the ends of the slats, and two side frame assemblies, each of which are adaptable for mounting to the opposite sides of an attached pickup truck body so as to be supported along the length of the upper section of the attached side of the pickup truck body, each said side frame being formed of a continuous rail of U-shaped cross-section of a size to fit about the end wheels fastened to the door cover slats, with each side frame rail shaped so as to extend, in the attached position, horizontally from the rear of the cab of the attached pickup truck along the top of the truck body side to past the rear of the truck body, bent to extend vertically upwards, and then bent to extend horizontally from the rear of the truck body forwards to the truck cab, said side rails forming a continuous track to permit sliding the cover slats of the door assembly into either an open position in which all the slats are supported by the upper horizontal section of the side rails or a closed position in which all the slats are supported by the lower horizontal section of the side rails so as to enclose the top of the truck bed of the attached truck, together with support means to fasten the side rails to the sides of a pickup truck body.

* * * * *